United States Patent [19]

Henry

[11] 4,049,016
[45] Sept. 20, 1977

[54] COMBINATION EXCESS FLOW AND DISCONNECT SHUTOFF VALVE FITTING

[75] Inventor: Ralph Eugene Henry, Rixford, Pa.

[73] Assignee: Dresser Industries, Inc., Dallas, Tex.

[21] Appl. No.: 686,205

[22] Filed: May 13, 1976

[51] Int. Cl.² ............................................. F16K 15/06
[52] U.S. Cl. .................................... 137/498; 137/517
[58] Field of Search .................. 137/517, 516.11, 460, 137/498, 470, 479, 484.4, 625.3; 251/333, 356

[56] References Cited

U.S. PATENT DOCUMENTS

| 1,764,181 | 6/1930 | Raetz et al. | 137/517 X |
| 2,569,176 | 9/1951 | Katcher | 137/543.21 |
| 2,574,851 | 11/1951 | Wagner | 137/625.3 |
| 2,888,061 | 5/1959 | Smith et al. | 137/517 |
| 3,794,077 | 2/1974 | Fanshier | 137/517 X |
| 3,861,414 | 1/1975 | Peterson | 137/517 X |

Primary Examiner—William R. Cline
Attorney, Agent, or Firm—Daniel Rubin

[57] ABSTRACT

A valve fitting insertable in a gas service pipe coupling for operably effecting gas flow interruption in response to either an encountered excess flow or in the event of a piping disconnect from the coupling. A tubular, stepped diameter valve body is sized for receipt within a pipe coupling to define an annular flow passage internally forming an annular seat at an intermediate location within the passage. A more or less T-shaped poppet having a scalloped faced hex head is spring biased in opposition to the gas flow and cooperates with the body seat to interrupt flow in response to an increasing flow pressure being exerted against the head. A pullout plate encircling the poppet shank is biased toward seating the poppet against the body seat for separately arresting gas flow there-past but is prevented from doing so when a pipe section is positioned in place within the coupling.

7 Claims, 8 Drawing Figures

COMBINATION EXCESS FLOW AND DISCONNECT SHUTOFF VALVE FITTING

BACKGROUND OF THE INVENTION

1. The field of art to which the invention pertains comprises the art of fluid handling as specifically directed to change responsive line condition units therefor.

2. Preventing excess flow in a wide variety of fluid handling apparatus is well known and exemplifying pipeline units for that purpose are the disclosures of U.S. Pat. Nos. 2,635,629; 2,656,850; 2,886,061; 3,032,067 and 3,095,899.

While such excess flow fittings have undoubtedly functioned well for their intended end uses, they have generally been regarded as unsuitable for gas distribution service in which clogging dirt and/or other foreign matter is likely to be contained. Notwithstanding, flow control is a particularly hazardous problem with gas distribution piping because of the potential consequences of introducing a combustible commodity in excess at some end use downstream. Where such piping is coupled underground, the units become increasingly unserviceable rendering it difficult if not impossible to detect problems of flow. At the same time an equally if not more hazardous problem is posed by inadvertent and undetected uncoupling of the distribution piping occasioned by careless excavation or the like in the vicinity of the buried pipe. Despite recognition of the mentioned problems it has not heretofore been known how to reliably accommodate either of the foregoing, much less resolve both in a single unitary structure.

SUMMARY OF THE INVENTION

The invention relates to pipe fitting apparatus and more specifically to a valve fitting insertable in a gas service pipe coupling and separately effective for interrupting gas flow both to prevent excess thruput or in the event of a piping disconnect from the coupling. Unlike analogous purpose units of the prior art, the apparatus hereof is particularly suitable for use with gas service piping in which dirt or other foreign particles might likely be contained in the pipeline content. Not only is the unit hereof capable of flow interruption against an encountered excess without being subject to clogging by contained dirt in the line content but it is likewise capable of effecting line shutoff in the event of a disconnect of the coupled pipe end regardless of the flow condition.

The foregoing is achieved in accordance herewith by a valve fitting having a tubular, stepped diameter body sized for receipt within a gas service pipe coupling. Defined internally of the body is a flow passage forming an annular seat at an intermediate location thereof. A T-shaped poppet having a scalloped faced head with a hex periphery is spring biased in the body passage against the incoming gas flow. The poppet cooperates with the passage seat to interrupt flow in response to an increased pressure of predetermined magnitude being exerted against its head. A pullout plate encircling the poppet shank for longitudinally interlocking therewith is superiorly biased toward moving the poppet against the seat for shutoff but is prevented from doing so when a pipe end is positioned in place within the coupling. Should excess flow be encountered, increased flow pressure opposing the poppet spring forces the poppet in a snap-like action toward the passage seat for interrupting the flow. In the event of a pipe end disconnect from the coupling, the pullout plate is simultaneously released after a predetermined excursion to longitudinally interlock with the tail end of the poppet shank for instantly urging the poppet head toward closing the passage against continued flow.

By forming the poppet head in a hex configuration in an otherwise annular passage of the body and having its face dished inwardly toward the periphery in a scalloped contour, dirt or other foreign particles can be directed to the larger clearances for pass thru without significantly affecting the valve trip point. At the same time provision is made for a controlled minimal leakage operable when the valve is closed to equalize upstream and downstream pressures for obtaining automatic reset after the excess flow condition is rectified.

It is therefore an object of the invention to provide a novel excess flow control device for use in gas service piping.

It is a further object of the invention to effect a novel shutoff device for coupled gas service piping to arrest gas flow in the event of a pipe end disconnect from the coupling.

It is a further object of the invention to effect the foregoing objects in a combination device.

It is a still further object of the invention to effect the last recited object with a relatively economical yet reliable construction suitable for buried underground piping.

Figure 1:
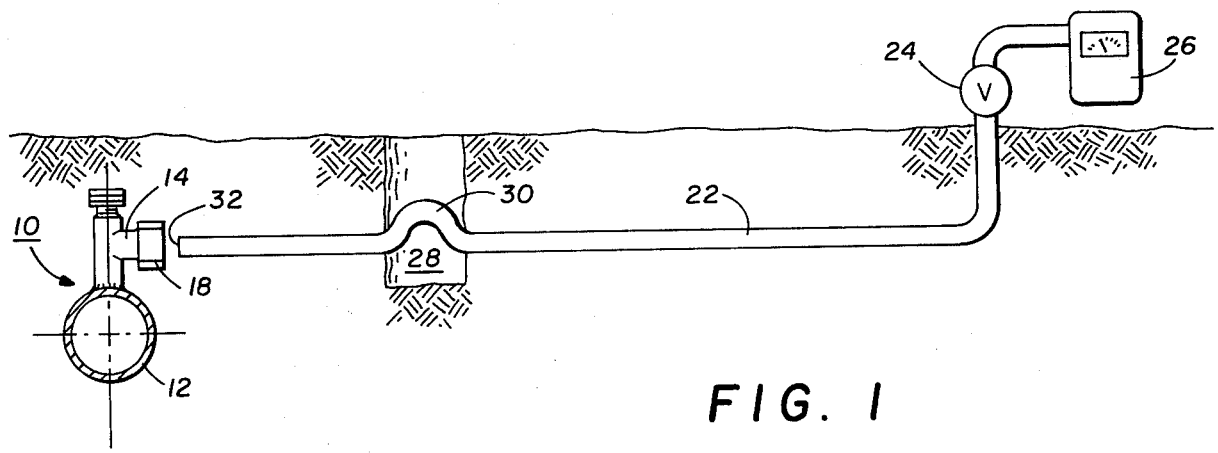
FIG. 1 illustrates a typical gas piping connection with which the fitting of the invention can be utilized.

Referring now to the drawings, there is illustrated in FIG. 1 a tapping tee 10, which may for example be of a type disclosed in U.S. Pat. No. 3,302,493, mounted on a gas main 12 and having a branch outlet 14. Connected to the branch outlet by means of a compression nut 18 and a compressible gasket 20 (FIG. 2) is an extensive run of underground gas piping 22 leading to an aboveground connection 24 supplying gas to a meter 26 for house service or the like. Noteworthy in FIG. 1 is an excavation at a site 28 in which a trencher or the like unintentionally formed a kink 30 in the pipeline causing pipe end 32 to disconnect from its coupled connection within tapping tee 10.

Figure 2:
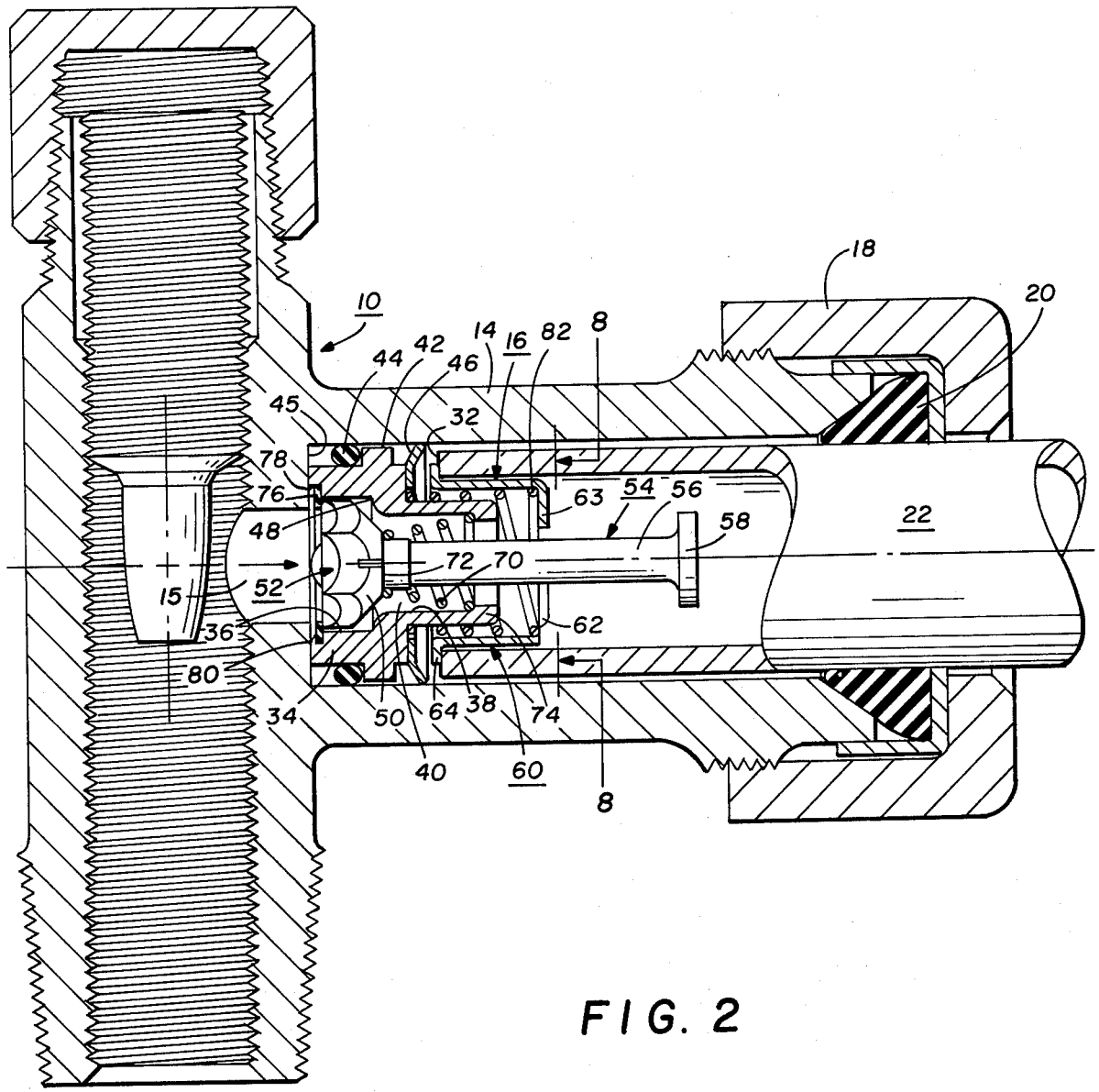
FIG. 2 is a sectional view through a tapping tee utilizing the fitting of the invention with the components thereof in their normal operating relation.

Contained within branch outlet 14 at inlet 15 is the valve fitting hereof designated 16 as best seen in FIG. 2. Comprising fitting 16 is a more or less tubular body 34 internally stepped coaxially from its inlet diameter 36 to a reduced outlet diameter 38 in defining a flow passage 40 therethrough. Radially formed in passage 40 at the location of the diametral stepdown is an annular seat 48. A radial flange 42 of diameter sufficient to be received within the branch connection is adapted to compress an O-ring gasket 44 toward the outlet shoulder 45 for maintaining a substantially seal tight relation thereat. Displaced rearward of flange 42 is an annular retainer 46 for reasons as will be explained.

Figure 6:
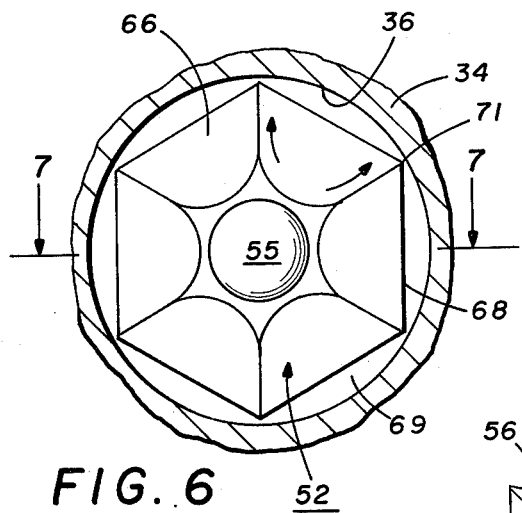
FIG. 6 is a left face view of the poppet head of FIG. 5.
Figure 5:
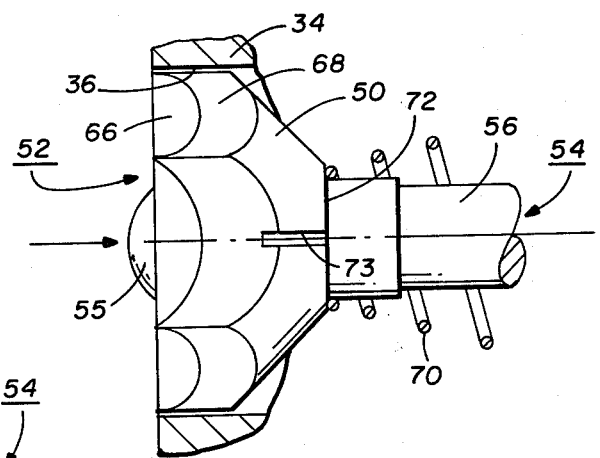
FIG. 5 is a side view of the poppet head hereof.
Figure 7:
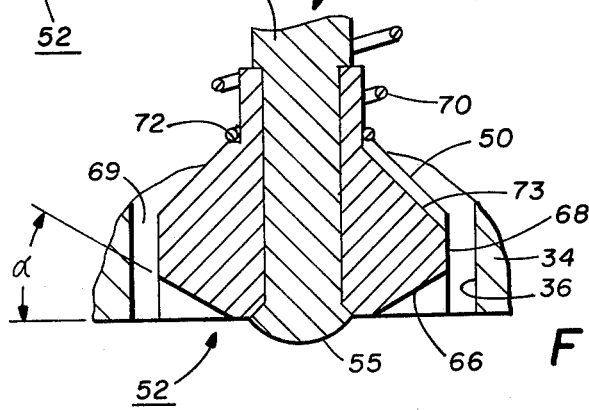
FIG. 7 is a sectional view taken substantially along the lines 7—7 of FIG. 6.

Adapted to cooperate with seat 48 for opening and closing passage 40 to flow is a more or less loosely held two part T-shaped poppet 54. Comprising the poppet is a head 52 peripherally formed of a hex or other suitable polygonal shape for reasons as will be understood. Backface 50 is chamfered for engaging seat 48. Connected to the head by a flare at 55 is a reduced diameter elongated shank 56 extending away from a shoulder 72 on the backside of the head to an annular terminating flange 58. The front face of head 52 is scalloped to form a plurality of inwardly dished surfaces 66 extending radially outward from a central location at an angle α of about 38 degrees until merging with one of the hex flats 68 between corners 71. With this arrangement maximum flow area past the poppet head and body diameter 36 thereat occurs across each hex flat 68 (FIG. 6) defining a flow control orifice 69 therebetween. Typically a flow clearance of less than about 1/32 inches is provided past corners 71 while a flow clearance of about 3/64 inches is provided through orifice 69. A shallow groove 73 enables controlled minimal leakage past head 52 when seated against seat 48 but can be omitted where total shutoff is preferred.

Urging the poppet leftward toward the gas inlet at 15 for opening passage 40 to flow past seat 48 is a coiled spring 70 encircling shank 56 between head shoulder 72 and an inwardly turned body flange 74 at the passage outlet. The load of spring 70 is selected to accommodate any desirable flow range with which the unit is to be operative. A retainer ring 76 contained in body counterbore 78 by staking at 80 limits the leftmost movement of the poppet.

Figure 8:
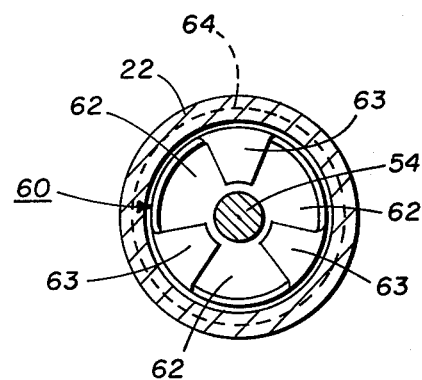
FIG. 8 is an end view seen substantially along the lines 8—8 of FIG. 2.

Positioned about shank 56 as to be freely slideable there-over is a cup-like pullout plate 60 having flow openings 62 between a plurality of equally spaced end fingers 63 (FIG. 8). A radially outward end flange 64 of pullout plate 60 is adapted to receive the inward end 32 of piping 22 for being urged toward contact with annular retainer 46. Operatively capable of overcoming the force of spring 70 acting in opposition thereto is a spring 82 coiled about body 34 and contained with the cup of pullout plate 60. Spring 82 is of a relatively greater spring load than spring 70 and when released by pipe end 32 acts to urge fingers 63 against shank flange 58 for forcing poppet head 52 into seating shutoff relation with seat 48.

In operation, the excess flow and disconnect unit 16 hereof is first positioned in a suitable gas coupling of which tee branch connection 14 is only exemplary. End 32 of pipe 22 is then inserted for coupling inwardly of the branch connection engaging flange 64 for forcing pullout plate 60 leftwardly in opposition to the force of its contained spring 82. When the pipe end is properly placed it is secured in its coupled relation by means of nut 18 and gasket 20.

Gas flow entering tee inlet 15 from main 12 encounters the front scalloped face of poppet head 52. Contour of the face generally deflects the flow from the center toward the larger flow areas of orifices 69 existing between each hex flat 68 and the internal surface of body diameter 36 thereat. Should inlet flow pressure across the poppet develop a pressure differential of greater magnitude than that provided by the opposing force of spring 70, the poppet is urged by the flow in a closing relation toward seat 48 until full seating occurs. By virtue of groove 73 a controlled leakage will occur past head 52 even when in the seated position thereof enabling an eventual pressure buildup on the downstream side of the head. When the closing differential is overcome the once seated head will be reopened by spring 70 thereby assuring automatic reset when the closure problem has been corrected.

Figure 3:
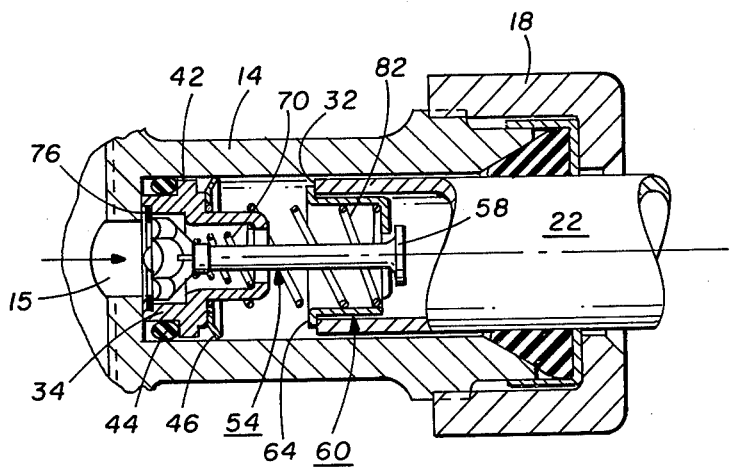
FIG. 3 is a reduced size fragmented sectional view similar to FIG. 2 with components of the fitting in a condition of a partial pipe end withdrawal.
Figure 4:
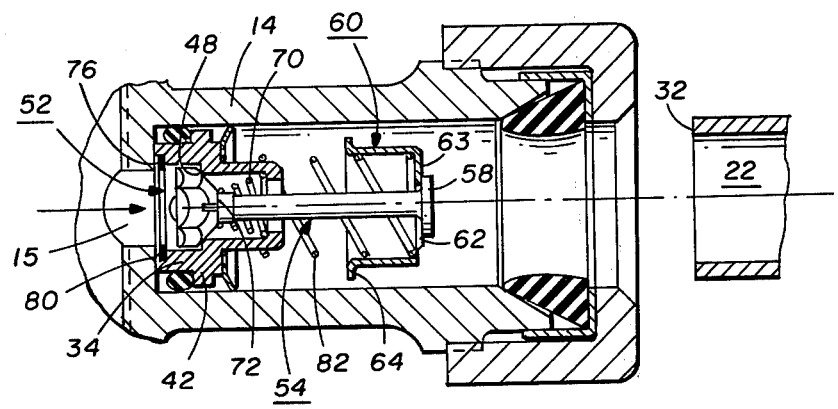
FIG. 4 is a reduced size fragmented sectional view similar to FIG. 2 with the components of the fitting in a condition of a total pipe end disconnect.

Comparing FIGS. 2 and 3, it can be seen that as pipe 22 is drawn outward of branch connection 14 as might occur in the course of excavating at site 28, pullout plate 60 is concomitantly forced along closely following the pipe by means of spring 82. Should pipe 22 be totally separated from the coupling in the manner illustrated in FIG. 4, fingers 63 of the pullout plate will promptly engage shank flange 58 and by the force of spring 82 rapidly force poppet head 52 against seat 48 for closing the passage to fluid flow. With this construction the excess flow feature functions independently of the disconnect feature until such time as a coupled pipe end approaches uncoupling from the branch connection. When the latter occurs, the pullout plate follows the pipe end as it slides outwardly until end fingers 63 engage flange 58 forcing the valve in opposition to spring 70 into its seated closed position. While under these circumstances some leakage will occur past groove 73, quantity is minimal such as to remain localized and within safe limits at the main remote from a house or other end use serviced thereby.

By the above description there is disclosed a novel combination excess flow and disconnect shutoff fitting for gas line service. By virtue of a novel construction in the poppet head of the fitting dirt or foreign particles entrained in the gas flow are easily passed such that problems previously associated with prior art devices are substantially if not completely eliminated. At the same time the unit operates to interrupt excess flow while assuring automatic self-reset after the excess flow problem has been corrected. With the poppet supported in a guideless floating relation, it is free to roll and move laterally likewise eliminating the problems of sticking from accumulation of system residue and/or particle lodgment. In the event a pipe end pullout should occur, a positive instant action is afforded for closing the valve and thereby prevent escape of its hazardous content. Whereas the unit is preferably fabricated in the combination form disclosed, it is apparent that each of the features could be utilized separately if desired.

Since many changes could be made in the above construction and many apparently widely different embodiments of this invention could be made without departing from the scope thereof, it is intended that all matter contained in the drawings and specification shall be interpreted as illustrative and not in a limiting sense.

The embodiments of the invention in which an exclusive property or privilege is claimed are defined as follows:

1. An excess flow pipe fitting for gas service piping comprising in combination:
   a. a tubular body defining an at least partially annular flow passage between an inlet and an outlet and sized for insertion within gas service piping for effecting a seal tight mounting therein;
   b. an annular seat defined in said passage at an intermediate location thereof;

c. a poppet in said passage for cooperating with said seat to open and close said passage to gas flow of the piping with which it is to be utilized; and d. poppet biasing means urging said poppet away from said seat toward the open position of said passage in opposition to gas flow received through said inlet;

e. said poppet having a head of polygonal periphery positioned in the annular portion of said flow passage and facing the inlet of said body to define a flow control orifice of varying dimension with respect to the passage wall thereat; said head having a front face confronting the inlet gas flow that is formed multiply dished sloping inwardly away from a central portion thereof toward the flats of said polygonal periphery and being responsive to excess flow pressure encountered at said inlet for moving said poppet in opposition to said poppet biasing means toward the closed position of said passage.

2. An excess flow pipe fitting according to claim 1 in which the front face of said head has a scalloped contour comprising a plurality of individually dished formations each extending from a central portion thereof toward one flat of said polygonal periphery.

3. An excess flow fitting according to claim 2 including controlled leakage means operably effective with said poppet in the closed position of said passage to enable reduction in the pressure differential between the upstream and downstream flow pressures exposed to the head of said poppet.

4. An excess flow pipe fitting according to claim 1 in which said service piping comprises compression coupling means for joining downstream service piping thereto and further including in combination shutoff means operative to move said poppet to said closed position in response to a predetermined excursion of the joined service pipe toward an uncoupling of the joined service pipe from said compression coupling.

5. An excess flow pipe fitting according to claim 4 in which said poppet includes an elongated shank connected to the downstream side of said head and said shutoff means includes a pullout plate movable between engagement and disengagement relation with said poppet shank and pullout plate biasing means urging said pullout plate toward engagement relation with said shank for moving said poppet to said closed position in response to said pipe uncoupling.

6. An excess flow pipe fitting according to claim 5 in which said pullout plate slideably encircles said poppet shank and said shank includes a radial enlargement at a predetermined location thereon engageable by said pullout plate for effecting said engagement relation.

7. An excess flow pipe fitting according to claim 6 in which said pullout plate biasing means is operably stayed by service pipe coupled in said coupling.

* * * * *